June 1, 1943.　　　F. H. MÜLLER　　　2,320,460
CUTTER
Filed Sept. 16, 1941
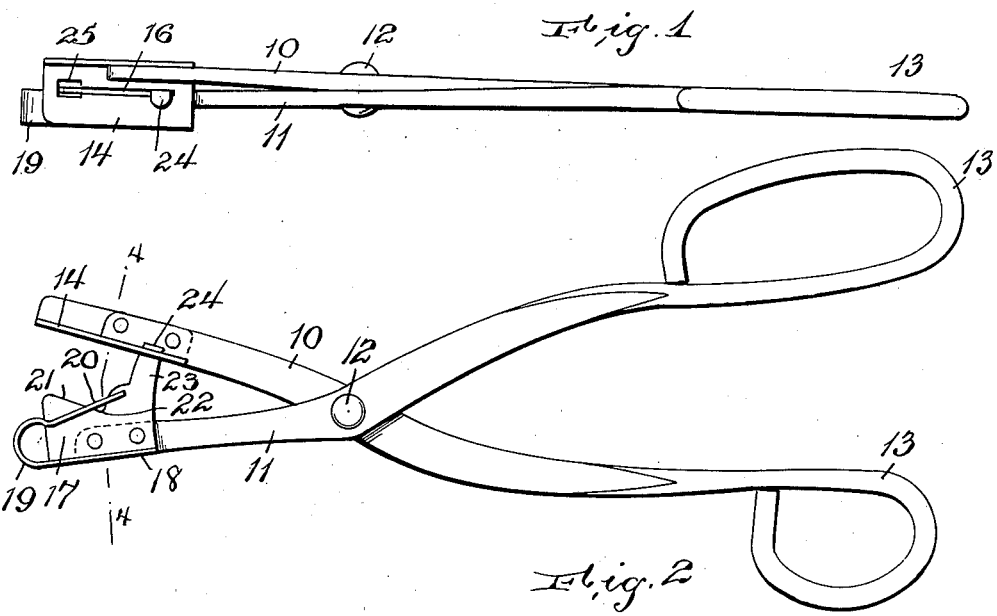
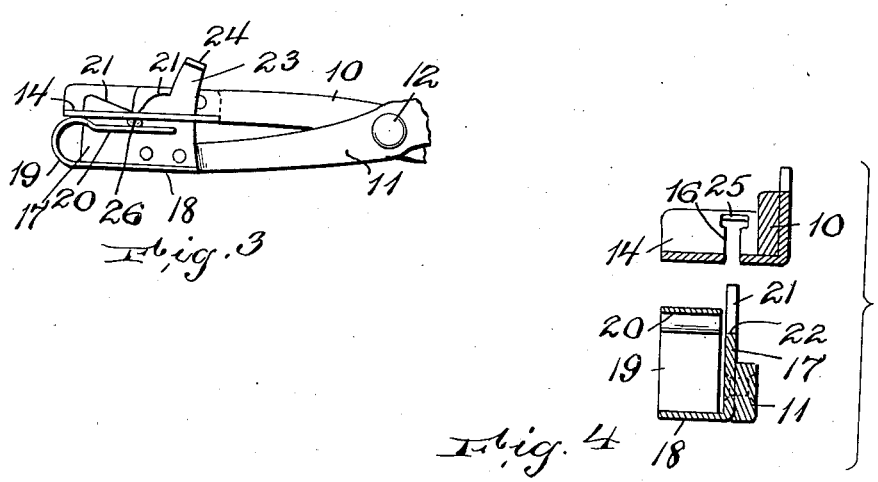
INVENTOR
Ferdinand H. Müller,
BY
Wm. H. Canfield Patented June 1, 1943

2,320,460

UNITED STATES PATENT OFFICE 2,320,460

CUTTER

Ferdinand H. Müller, Montclair, N. J.

Application September 16, 1941, Serial No. 410,991

9 Claims. (Cl. 30—134)

This invention relates to an improved cutter adaptable for various uses but which is particularly designed for cutting articles without compressing or squeezing the severed ends to any great extent. This is very advantageous in cutting plants such as flowers and tends to do no damage to the plants and to leave the stems of cut flowers in a condition that they keep longer than when the stems are crushed.

The improved cutter is also designed to grasp the cut article such as the stem of the flower without too much pressure until it can be deposited in a receptacle, thus requiring only one hand for cutting and for depositing.

The invention includes various details of construction which will be hereinafter more fully described and also embodied in some of the claims.

The invention is illustrated in the accompanying drawing which illustrates one embodiment of the invention. In the drawing Figure 1 is a side view of an improved cutter designed as a flower cutter. Figure 2 is a top view of the cutter shown in Figure 1 with the jaws separated. Figure 3 is a top view of the cutter showing the jaws closed, the handles being omitted. Figure 4 is an enlarged section on line 4—4 in Figure 2 looking toward the ends of the jaws.

The cutter comprises jaws 10 and 11 which are pivoted at 12. The jaws may be extended beyond the pivot, thus forming pivoted levers having the handle portions 13.

The jaw 10 is provided with a plate 14 which forms an anvil usually made of stiff metal and formed with a side piece riveted to the side of the jaw 10. The plate or anvil 14 is provided with a slit 16 which slit is preferably arranged longitudinally relative to the jaw.

The jaw 11 is provided with a blade 17 which is secured to the side of the jaw 11 by rivets and extends in line with the slit 16. The blade 17 is provided with a bottom part 18 which is bent over at the end into a loop or abutment 19 and then extends as a thin flexible plate 20 which is retreated or set back from the loop 19. The loop is arranged to be engaged by the anvil 14 when the jaws are closed and thus spaces the plate 20 from the anvil to insure only slight pressure on a cut article.

The blade has its edge 21 formed into a flattened V-shape with its cutting surfaces converging into a recessed part 22. At the rear end of the blade it extends in the form of a finger 25 bent over at the top to form a stop 24. The blade extends through the slit 16 and the stop 24 limits the opening movement of the jaws. The slit 16 has an enlarged outer end 25 to aid in the assembly of the cutter as it allows the hook or stop 24 to be passed through the opening 25 and then the finger 25 is passed along the slit 16 to enable the rivet 12 to be secured in place.

The cutter is used by placing the cutter so that its jaws flank an article to be cut, such as a flower stem. The jaws are then closed and the stem moves along the surface 21 until it is seated in the part 22. The cutter 17 passes through the slit 16 after cutting stem which is shown at 26. As soon as the cut is complete the anvil 14 and the loop 19 engage and the stem 26 is tightly held by the flat spring 20. It can be so held by keeping the jaws together and carried by the cutter to a basket or other receptacle and then released by opening the jaws.

The cutter 17 is preferably provided with an unsharpened edge 21 and the converging edges provide for the bottom or recessed portion and 23 which takes out a short length of stem while passing through the slit 16. This is similar to the action of a die. The blunt or unsharpened edge cuts in marked contrast to a shear cut. In the case of shears the stems are squeezed together before the cut is completed and this closes the stems and unfavorably affects its capacity for absorption of water after cutting.

The present cutter does not crush the stem and the pressure by the spring 26 is only enough to hold the stem between the jaws. The severed ends on the plant and on the cut flower are only slightly compressed in cutting and resume their natural roundness after removal from the cutter.

Various modifications in sizes and proportions may be made without departing from the scope of the invention.

I claim:

1. A cutter comprising two pivoted levers having handle portions on one end, an anvil having a slit therein on the other end of one lever, an unsharpened blade on the other end of the second lever the blade having a V-shaped engaging edge, and a light spring plate alongside the blade and positioned to lightly hold a severed part against the anvil the plate including a part for limiting the closing movement of the jaws.

2. A cutter comprising two pivoted levers having handle portions on one end, an anvil having a slit therein on the other end of one lever, an unsharpened blade on the other end of the second lever, a light spring plate alongside the blade and positioned to lightly hold a severed part against the anvil and means on the plate for engaging the anvil in advance of the plate to prevent crushing of the severed part the plate including a part for limiting the closing movement of the jaws.

3. A cutter comprising two pivoted levers having handle portions on one end, an anvil having a slit therein on the other end of one lever, an unsharpened blade on the other end of the second lever, a light spring plate alongside the blade and positioned to lightly hold a severed part against the anvil, means on the plate for engaging the anvil in advance of the plate to prevent crushing of the severed part and a finger passing from the blade through the slit in the anvil for limiting the separation of the ends of the levers and acting as a stop for articles entering the cutter the plate including a part for limiting the closing movement of the jaws.

4. A cutter comprising opposed hinged jaws, a flat anvil on one jaw, the anvil having a slit in it, a blade on the other jaw for passing through the slit, and a spring plate alongside the blade for holding a severed article against the anvil the plate including a part for limiting the closing movement of the jaws.

5. A cutter comprising a pair of opposed hinged jaws, a flat anvil on one jaw, a blade on the other jaw and adapted to pass through the slit, the cutting edge of the blade having a V-shaped edge for localizing the cutting operation.

6. A cutter comprising a pair of opposed hinged jaws, a flat anvil on one jaw, a blade on the other jaw and adapted to pass through the slit, the cutting edge of the blade having a V-shaped edge for localizing the cutting operation and a light spring plate alongside the cutter holding a severed article against the anvil.

7. A cutter comprising a pair of opposed hinged jaws, a flat anvil on one jaw, a blade on the other jaw and adapted to pass through the slit, the cutting edge of the blade having a V-shaped edge for localizing the cutting operation, a light spring plate alongside the cutter holding a severed article against the anvil, the holding portion of the plate being slightly set-back to prevent crushing the article so held when the advanced part of the plate engages the anvil.

8. A cutter comprising a pair of opposed jaws, a flat anvil secured to one jaw, the anvil having a longitudinal slit therein, a sheet metal piece on the other jaw, the sheet being bent into a bottom part, a blade extending from the bottom part and in line with the slit to pass through the slit in the cutting operation, the bottom being bent at one end into a curved abutment to be engaged by the anvil for limiting the closing of the jaws and terminating in a set-back portion for lightly pressing a cut article against the anvil.

9. A cutter comprising a pair of opposed jaws, a flat anvil secured to one jaw, the anvil having a longitudinal slit therein, a sheet metal piece on the other jaw, the sheet being bent into a bottom part, a blade extending from the bottom part and in line with the slit to pass through the slit in the cutting operation, the bottom being bent at one end into a curved abutment to be engaged by the anvil for limiting the closing of the jaws and terminating in a set-back portion for lightly pressing a cut article against the anvil, the blade having its cutting edge deeply notched at the center for localizing the cutting operation.

FERDINAND H. MÜLLER.